United States Patent
Uno

(10) Patent No.: US 12,088,896 B2
(45) Date of Patent: Sep. 10, 2024

(54) ELECTRONIC DEVICE, IMAGING DEVICE, AND MOBILE BODY

(71) Applicant: KYOCERA Corporation, Kyoto (JP)

(72) Inventor: Yoshinori Uno, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 305 days.

(21) Appl. No.: 17/602,606

(22) PCT Filed: Apr. 1, 2020

(86) PCT No.: PCT/JP2020/015084
§ 371 (c)(1),
(2) Date: Oct. 8, 2021

(87) PCT Pub. No.: WO2020/217908
PCT Pub. Date: Oct. 29, 2020

(65) Prior Publication Data
US 2022/0191360 A1    Jun. 16, 2022

(30) Foreign Application Priority Data
Apr. 22, 2019   (JP) .................. 2019-081330

(51) Int. Cl.
*H04N 23/54*    (2023.01)
*B60R 11/04*    (2006.01)
*G03B 17/02*    (2021.01)
*H04N 23/51*    (2023.01)

(52) U.S. Cl.
CPC ............. *H04N 23/54* (2023.01); *B60R 11/04* (2013.01); *G03B 17/02* (2013.01); *H04N 23/51* (2023.01)

(58) Field of Classification Search
CPC ........ H04N 23/50; H04N 23/51; H04N 23/52; H04N 23/54; H04N 23/55; H04N 23/57; B60R 11/04
USPC ........................................... 348/374
See application file for complete search history.

(56) References Cited

U.S. PATENT DOCUMENTS

| | | | |
|---|---|---|---|
| 8,970,700 B2 | 3/2015 | Inoue et al. | |
| 10,593,716 B2 | 3/2020 | Sakamoto et al. | |
| 10,681,251 B2 | 6/2020 | Park | |
| 2010/0097519 A1* | 4/2010 | Byrne | B60R 1/00 348/373 |
| 2013/0222596 A1* | 8/2013 | Han | B60R 11/04 348/148 |
| 2015/0327377 A1 | 11/2015 | Mano et al. | |
| 2018/0164528 A1* | 6/2018 | Sakamoto | H04N 23/51 |

(Continued)

FOREIGN PATENT DOCUMENTS

| | | |
|---|---|---|
| CN | 108463771 A | 8/2018 |
| JP | 2007-028430 A | 2/2007 |

(Continued)

*Primary Examiner* — Anthony J Daniels
(74) *Attorney, Agent, or Firm* — Studebaker & Brackett PC

(57) ABSTRACT

An electronic device has an electronic component, a substrate on which the electronic component is mounted, and a housing having a tubular shape. The housing includes a first metal plate that is a tubular metal plate covering the electronic component and the substrate from the outer peripheral direction of the substrate and a second metal plate that is a tubular metal plate joined to the first metal plate from the radially inner side, a portion of each of the first metal plate and the second metal plate being covered with resin.

9 Claims, 10 Drawing Sheets

(56) References Cited

U.S. PATENT DOCUMENTS

2019/0025674 A1* 1/2019 Hwang .................. G03B 17/08
2019/0028620 A1 1/2019 Park
2021/0392253 A1* 12/2021 Hori ........................ H01L 23/00

FOREIGN PATENT DOCUMENTS

| JP | 2011-259101 A | 12/2011 |
| JP | 2017-174601 A | 9/2017 |
| JP | 2018-098533 A | 6/2018 |
| WO | 2006/088051 A1 | 8/2006 |

* cited by examiner

ELECTRONIC DEVICE, IMAGING DEVICE, AND MOBILE BODY

CROSS REFERENCE TO RELATED APPLICATION

This application claims priority to and the benefit of Japanese Patent Application No. 2019-081330 filed on Apr. 22, 2019, the entire disclosure of which is incorporated herein by reference.

TECHNICAL FIELD

The present disclosure relates to an electronic device, an imaging device, and a mobile body.

BACKGROUND ART

Electronic devices such as onboard cameras have been required to be smaller and to perform a variety of processes at high speed. As circuit boards are, for example, increasingly highly integrated for size reduction, the radiation noise from the electronic devices on the circuit boards increases. Thus, a configuration having a shielding member that covers the entire side surface of a circuit board has been proposed.

SUMMARY OF INVENTION

To solve the above-described problems, an electronic device according to a first aspect includes
an electronic component,
a substrate on which the electronic component is mounted, and
a housing having a tubular shape and including a first metal plate that is a tubular metal plate covering the electronic component and the substrate from the outer peripheral direction of the substrate and a second metal plate that is a tubular metal plate joined to the first metal plate from the radially inner side, a portion of each of the first metal plate and the second metal plate being covered with resin.

In addition, an imaging device according to a second aspect includes
an imaging optical system,
an electronic component including at least an image sensor,
a substrate on which the electronic component is mounted, and
a housing having a tubular shape and including a first metal plate that is a tubular metal plate covering the electronic component and the substrate from the outer peripheral direction of the substrate and a second metal plate that is a tubular metal plate joined to the first metal plate from the radially inner side, a portion of each of the first metal plate and the second metal plate being covered with resin.

In addition, a mobile body according to a third aspect includes
an imaging device including
an imaging optical system,
an electronic component including at least an image sensor,
a substrate on which the electronic component is mounted, and
a housing having a tubular shape and including a first metal plate that is a tubular metal plate covering the electronic component and the substrate from the outer peripheral direction of the substrate and a second metal plate that is a tubular metal plate joined to the first metal plate from the radially inner side, a portion of each of the first metal plate and the second metal plate being covered with resin.

DESCRIPTION OF EMBODIMENTS

An object of the present disclosure is to provide an electronic device, an imaging device, and a mobile body that enable further size reduction while having a shielding property against radiation noise.

Hereinafter, an electronic device, an imaging device, and a mobile body according to an embodiment of the present disclosure will be described with reference to the drawings.

Figure 1:
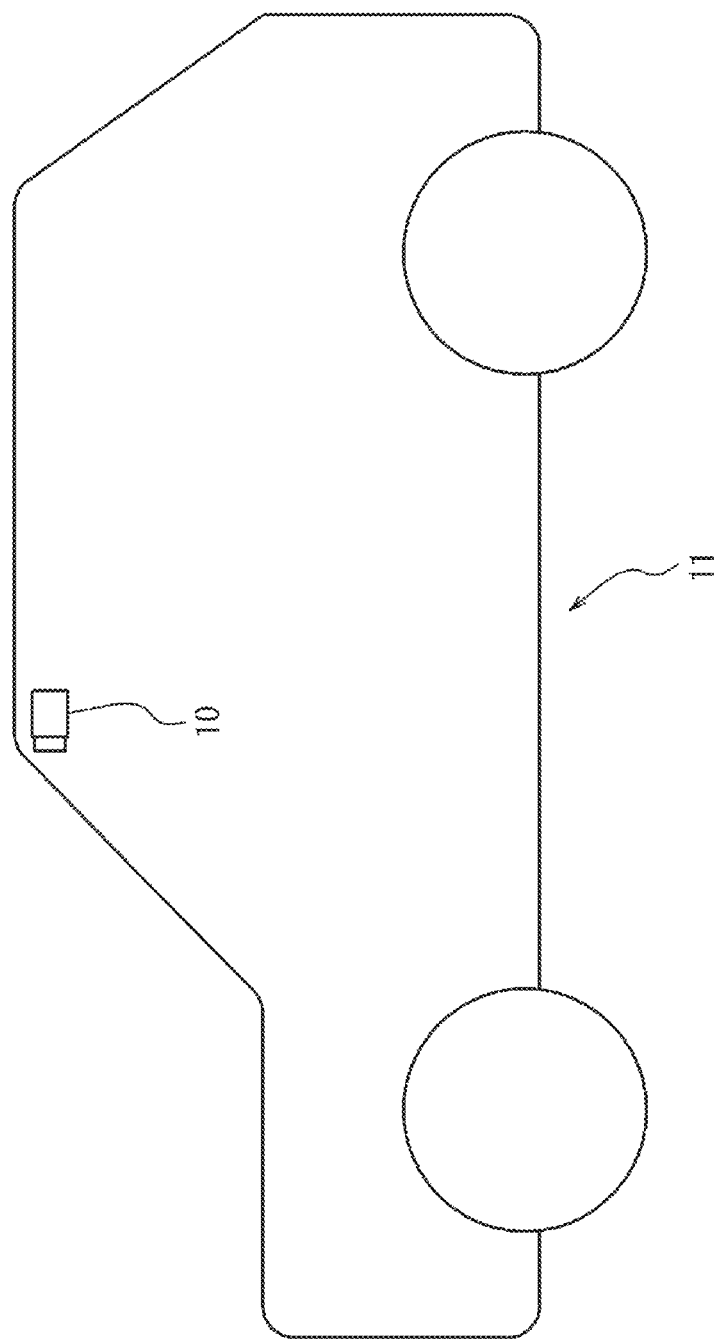
FIG. 1 is a layout diagram illustrating, in a mobile body, the mounting position of an electronic device according to an embodiment.

The electronic device according the embodiment is specifically, for example, an imaging device. As FIG. 1 illustrates, an electronic device 10 applied to the imaging device according to the embodiment is mounted, for example, in a mobile body 11.

Examples of the mobile body 11 may include vehicles, vessels, and aircraft. Vehicles may include automobiles, industrial vehicles, railroad vehicles, vehicles for daily life, and fixed-wing aircraft that travel on a runway. Automobiles may include, for example, passenger vehicles, trucks, buses, two-wheeled vehicles, and trolley buses. Industrial vehicles may include, for example, industrial vehicles for agricultural use and construction use. Industrial vehicles may include, for example, forklifts and golf carts. Industrial vehicles for agricultural use may include, for example, tractors, cultivators, transplanters, binders, combine-harvesters, and lawn mowers. Industrial vehicles for construction use may include, for example, bulldozers, scrapers, power shovels, crane vehicles, dump trucks, and road rollers. Vehicles may include vehicles that travel by using human power. Classification of such vehicles is not limited to the above-described example. For example, automobiles may include industrial vehicles that are allowed to travel on the road. Plural categories may include the same type of vehicles. Vessels may include, for example, personal watercrafts, boats, and tankers. Aircraft may include, for example, fixed-wing aircraft and rotary wing aircraft.

Figure 2:
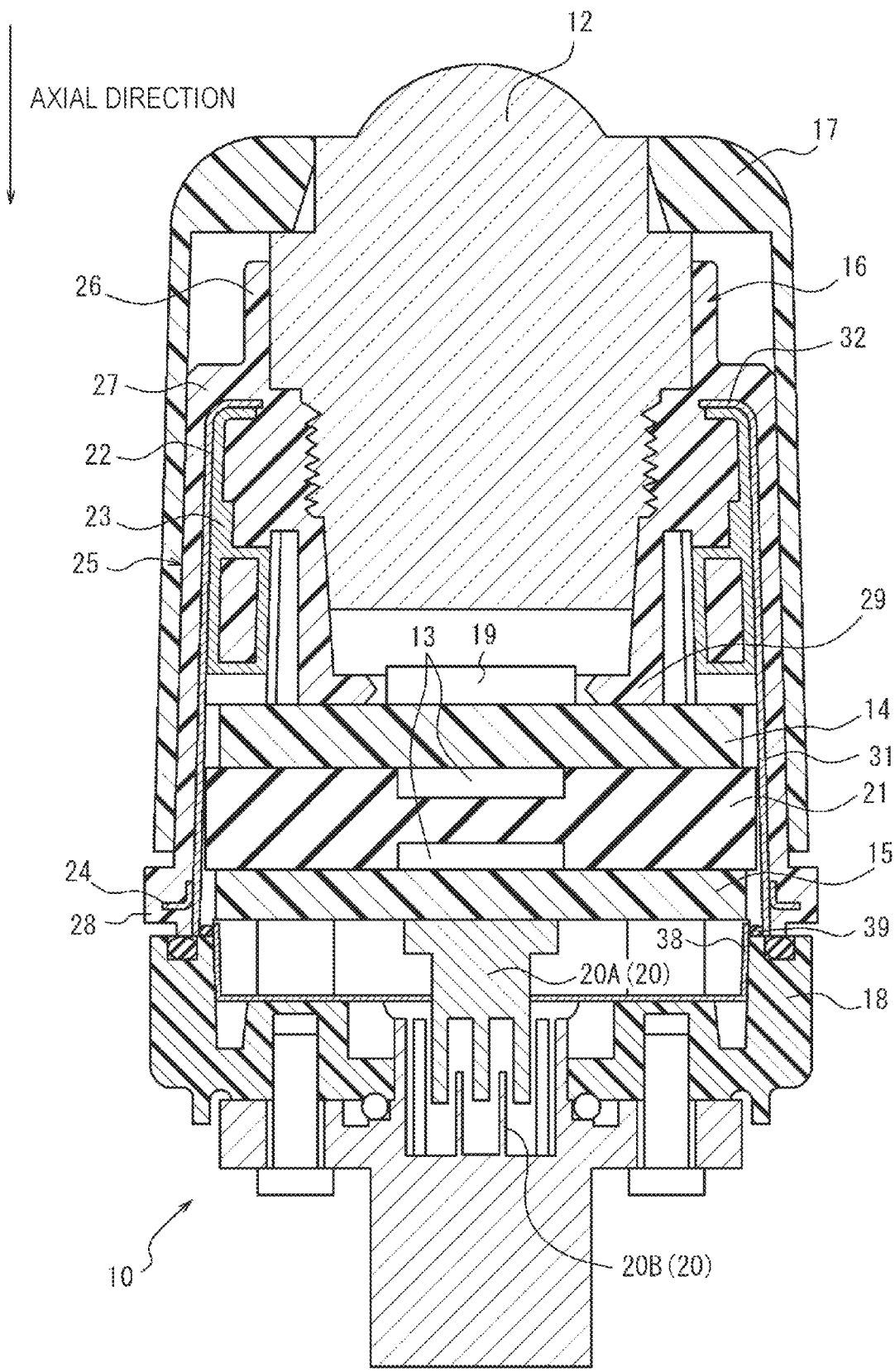
FIG. 2 is a sectional view of a schematic configuration of the electronic device in FIG. 1, taken along the optical axis of an imaging optical system.

As FIG. 2 illustrates, the electronic device 10 has an imaging optical system 12, electronic components 13, a first substrate (a substrate) 14, a second substrate 15, a first housing (a housing) 16, a second housing 17, and a third housing 18. The electronic components 13 may include at least an image sensor 19. In the present embodiment, the electronic device 10 is formed by the electronic components 13 being accommodated in, for example, the first housing 16 having a tubular shape. In the present disclosure, the axis of the electronic device 10 means the axis of the first housing 16 in the electronic device 10.

The imaging optical system 12 includes an optical element such as a lens. The imaging optical system 12 is designed and formed so that optical properties such as the angle of view and the depth of field have desired values. Through the imaging optical system 12, a subject image is formed on a light receiving surface of the image sensor 19.

The image sensor 19 is, for example, a CCD (Charge Coupled Device) image sensor or a CMOS (Complementary Metal Oxide Semiconductor) image sensor and generates an image signal by capturing the optical image formed on the light receiving surface.

The first substrate 14 is a plate-shaped member. The first substrate 14 may be substantially rectangular. The first substrate 14 has main surfaces on which the electronic components 13 including, for example, the image sensor 19 are mounted. The first substrate 14 has the main surface which is joined to a joining portion 29 of the first housing 16 and on which the image sensor 19 is mounted. Another electronic component 13 may further be mounted on at least one of the main surfaces of the first substrate 14: the main surface on which the image sensor 19 is mounted and the main surface opposite to the main surface on which the image sensor 19 is mounted. The electronic component 13, for example, drives the image sensor 19 or processes an image signal generated by the image sensor 19.

The second substrate 15 is a plate-shaped member. The second substrate 15 may be substantially rectangular. The electronic component 13 is mounted on at least one of the main surfaces of the second substrate. The second substrate 15 may be electrically connected to the first substrate 14 by, for example, a flexible substrate or a connector. The second substrate 15 may further have a connector 20A, which is mounted on a main surface, for electrically connecting the second substrate 15 to a connector 20B of the third housing 18.

The first substrate 14 and the second substrate 15 are arranged in the axial direction of the electronic device 10 so that the main surfaces of the respective substrates face each other. In the present embodiment, a heat dissipating sheet 21 is provided between the first substrate 14 and the second substrate 15 so as to be in contact with each of the first substrate 14 and the second substrate 15. The heat dissipating sheet 21 may be made of a soft material having shape conformability and having relatively high heat conductivity, as with filler-containing silicone rubber.

Figure 3:
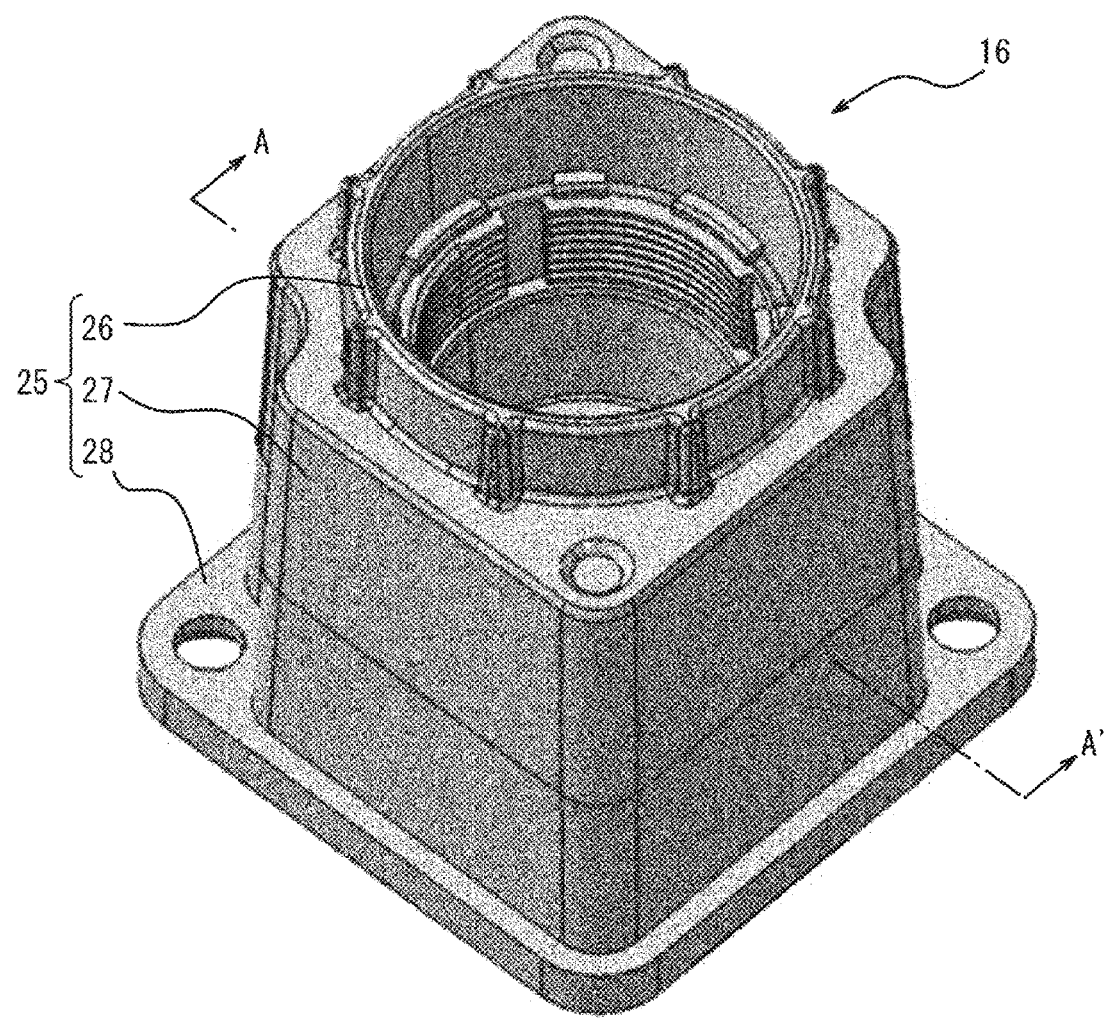
FIG. 3 is a perspective view of the appearance of a first housing in FIG. 1.
Figure 4:
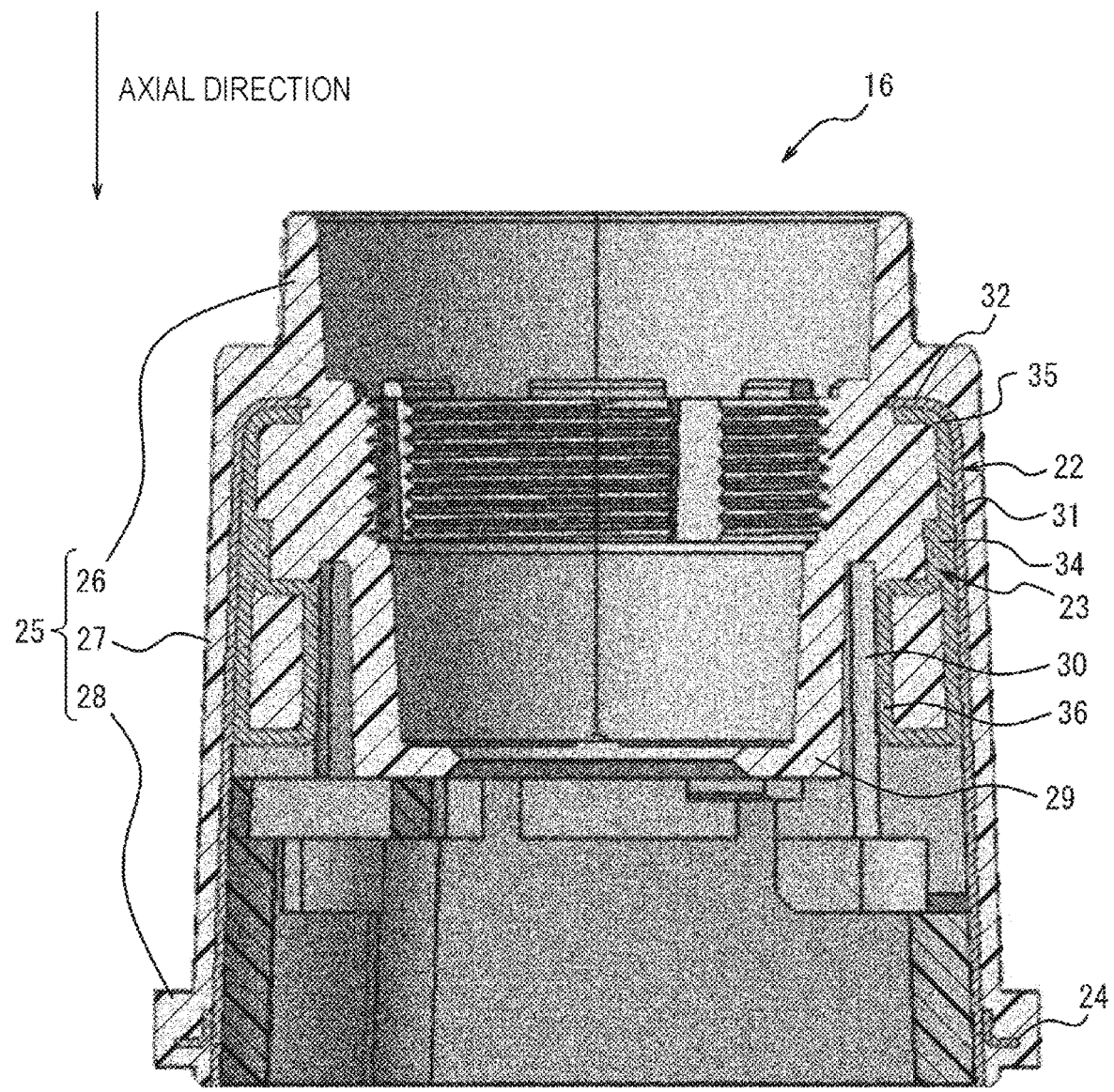
FIG. 4 is a sectional view of the first housing in FIG. 3, taken in the axial direction at line A-A' in FIG. 3.

As FIG. 3 and FIG. 4 illustrate, the first housing 16 is a housing having a tubular shape. FIG. 4 is a sectional view of the first housing 16 illustrated in FIG. 3, taken in the axial direction at line A-A'. As FIG. 4 illustrates, the first housing 16 has a first metal plate 22, a second metal plate 23, a third metal plate 24, and a resin portion 25. The first housing 16 is formed by insert molding in which the resin portion 25 is formed by a resin material such as polyamide being injected into, for example, a mold in which the first metal plate 22, the second metal plate 23, and the third metal plate 24 are installed in advance.

The resin portion 25 is constituted by a first open portion 26, a tubular portion 27, and a second open portion 28 that are arranged sequentially in the axial direction of the first housing 16. The first open portion 26 may have a tubular shape extending continuously from an end, in the axial direction, of the tubular portion 27 and having a substantially circular section. The tubular portion 27 may have a tubular shape having a substantially rectangular section. The second open portion 28 may have a substantially rectangular tubular shape that is continuous, in the axial direction, from an end of the tubular portion 27 opposite to the end of the tubular portion 27 continuous from the first open portion 26 and that protrudes further than the tubular portion 27 in the radial direction. Although the resin portion 25 is made of a resin material such as polyamide as described above, the material of the resin portion 25 is not limited thereto, and the resin portion 25 may be made of any resin material.

As FIG. 2 illustrates, in the electronic device 10 according to the present embodiment, the first housing 16 accommodates the imaging optical system 12 so that the optical axis of the imaging optical system 12 substantially coincides with the axis of the first housing 16 and so that the imaging optical system 12 is exposed from the first open portion 26. Thus, as FIG. 4 illustrates, in the first housing 16, at least a portion of the inner surface of the tubular portion 27 may have an internal thread for fixing the imaging optical system 12.

Figure 9:
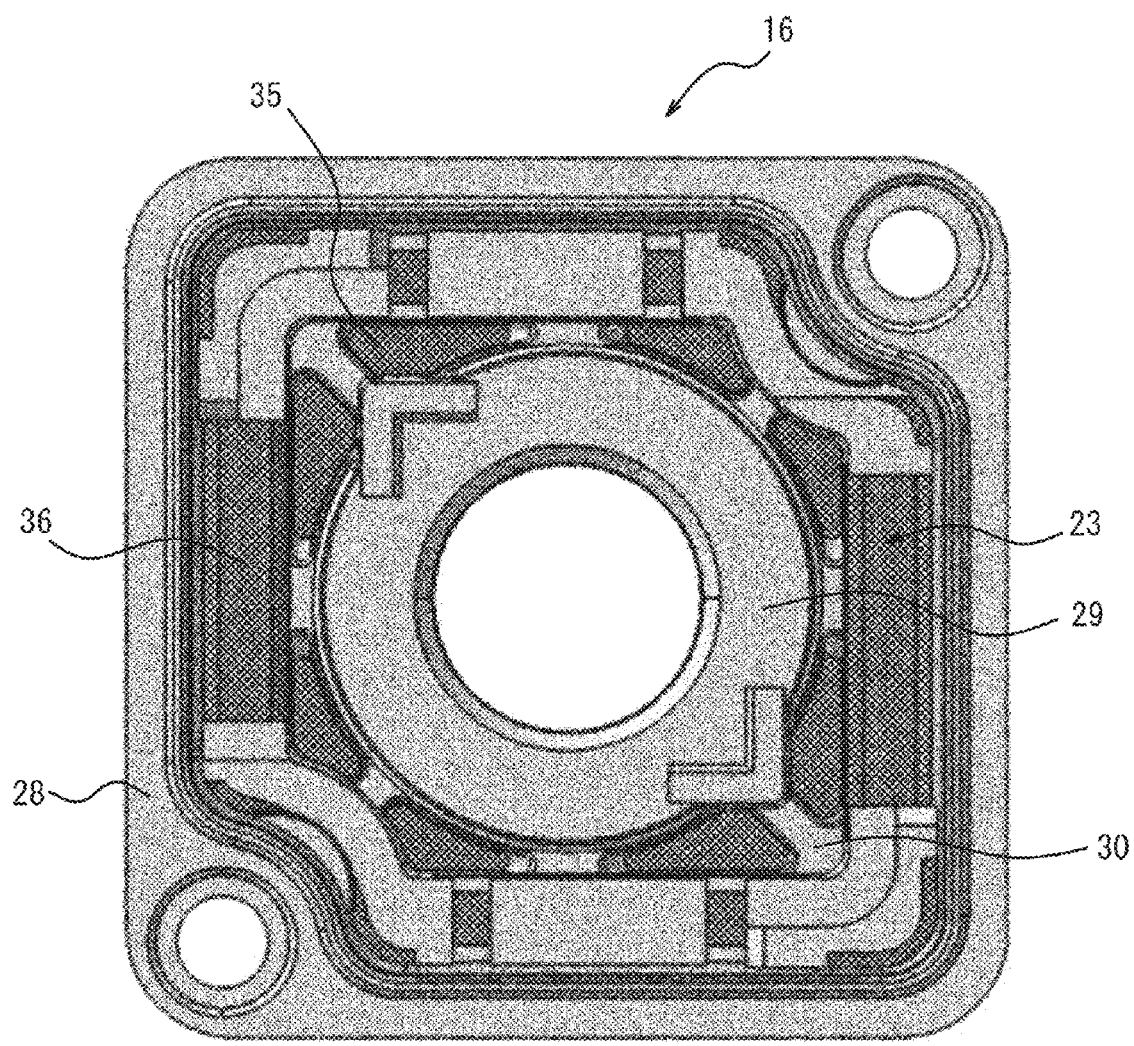
FIG. 9 is a schematic view of the appearance of the first housing in FIG. 3 as viewed from the side of a second open portion.

In addition, as FIG. 2 illustrates, the first housing 16 may accommodate the first substrate 14 so that the image sensor 19 is fixed at a predetermined position and in a predetermined orientation with respect to the imaging optical system 12. Specifically, the first housing 16 may accommodate the first substrate 14 so that the line extending orthogonally from the center of the light receiving surface of the image sensor 19 coincides with the optical axis. Thus, as FIG. 4 illustrates, in the first housing 16, at least a portion of the inner surface of the tubular portion 27 has the flat joining portion 29 extending substantially orthogonally to the axial direction. In the present embodiment, as FIG. 9 illustrates, in the first housing 16, the joining portion 29 is formed to have a ring shape as viewed orthogonally to the axial direction from the second open portion 28 side and is formed to be capable of accommodating the image sensor 19 radially inside the joining portion 29. As FIG. 2 illustrates, in the present embodiment, the joining portion 29 is bonded and fixed to the main surface of the first substrate 14 on which the image sensor 19 is mounted so that the image sensor 19 is positioned radially inside the joining portion 29 with the first housing 16 accommodating the first substrate 14.

As FIG. 4 illustrates, in the first housing 16, a mold receiving portion 30 is further formed in the tubular portion 27 so as to surround the radially outer periphery of the joining portion 29. The mold receiving portion 30 is a recessed groove extending substantially parallel to the axial direction from the second open portion 28 side toward the first open portion 26 side. In the present embodiment, as FIG. 9 illustrates, the mold receiving portion 30 is a recessed groove having a substantially rectangular outer periphery and a substantially circular inner periphery as viewed orthogonally to the axial direction from the second open portion 28 side.

Figure 5:
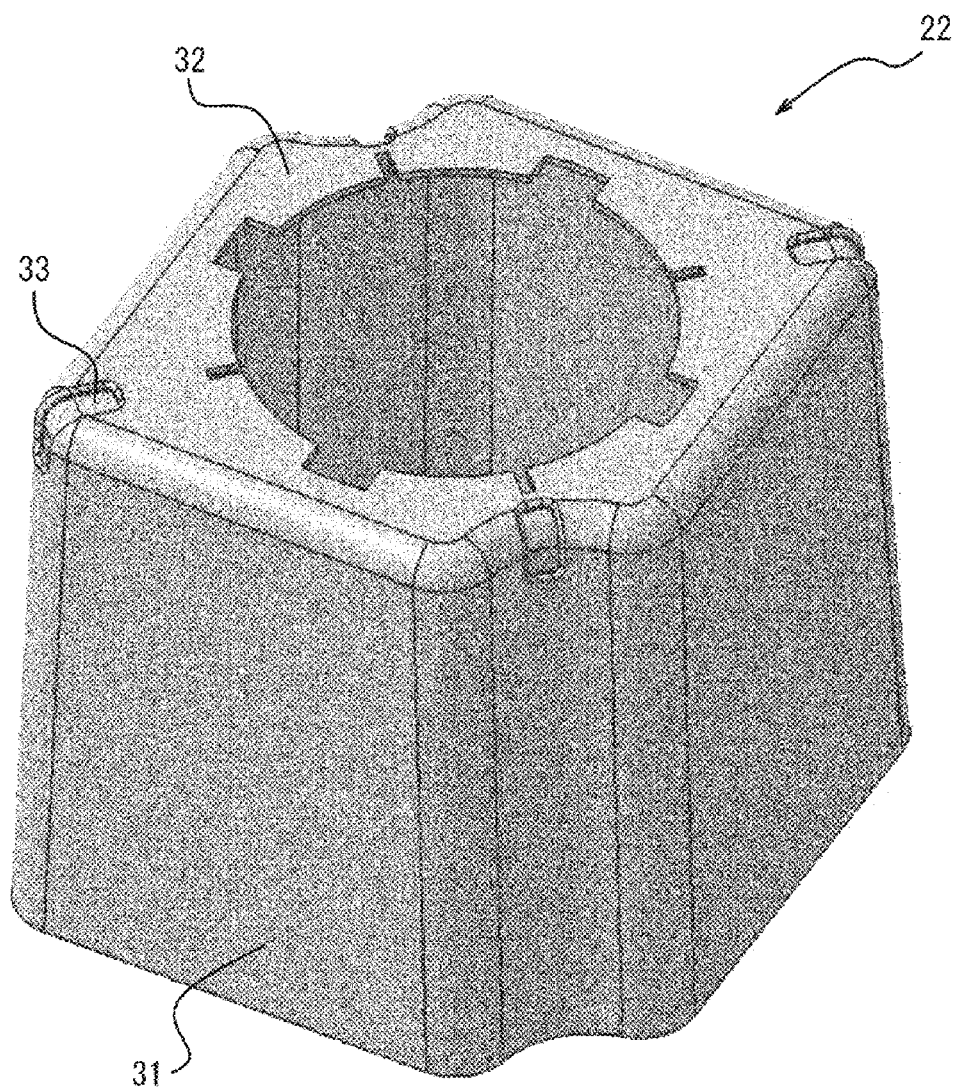
FIG. 5 is a perspective view of the appearance of a first metal plate in FIG. 2.

Hereinafter, the first metal plate 22, the second metal plate 23, and the third metal plate 24 that are formed in the first housing 16 by insert molding will be described. As FIG. 5 illustrates, the first metal plate 22 has a tubular shape having a generally substantially rectangular section. The first metal plate 22 has a first peripheral wall portion 31 and a first plate portion 32.

The first peripheral wall portion 31 has a tubular shape having a substantially rectangular section. As FIG. 2 illustrates, in the electronic device 10, the first peripheral wall portion 31 covers the first and second substrates 14 and 15 and the electronic components 13 such as the image sensor 19 mounted on the substrates, from the radially outer side, that is, from the outer peripheral direction of each of the first substrate 14 and the second substrate 15.

As FIG. 5 illustrates, the first plate portion 32 has a substantially plate shape. The first plate portion 32 extends radially inward from an end, in the axial direction, of the first peripheral wall portion 31. The area surrounded by the outer edge of the first plate portion 32 may have a substantially rectangular shape larger than the main surfaces of the first substrate 14 and the second substrate 15. The first plate portion 32 has an opening for exposing the imaging optical system 12 when accommodating the imaging optical system 12. As FIG. 2 illustrates, in the electronic device 10, the first plate portion 32 faces and covers at least a portion of the main surface of each of the first substrate 14 and the second substrate 15.

As FIG. 5 illustrates, a drawing portion 33 is provided, in the outer edge of the first plate portion 32, from the first plate portion 32 to the first peripheral wall portion 31. In the state where the first metal plate 22 is installed in, for example, a mold so that the first plate portion 32 faces vertically upward, the drawing portion 33 may be provided at the position at which the drawing portion 33 faces an injection port through which resin is injected into the mold from vertically above, during the insert molding of the first housing 16. In the present embodiment, the drawing portion 33 is provided, in the first metal plate 22, at each of the four corners of the substantially rectangular first plate portion 32. The drawing portion 33 has a shape recessed toward the inner side relative to the tubular first metal plate 22.

The first metal plate 22 is formed by predetermined portions of a metal plate, in other words, a substantially tubular plate made of metal being pressed or bent. Thus, the first metal plate 22 is formed seamlessly. Although the first metal plate 22 is made of, for example, an alloy such as nickel silver, the material of the first metal plate 22 is not limited thereto, and the first metal plate 22 may be made of any metal.

Figure 6:
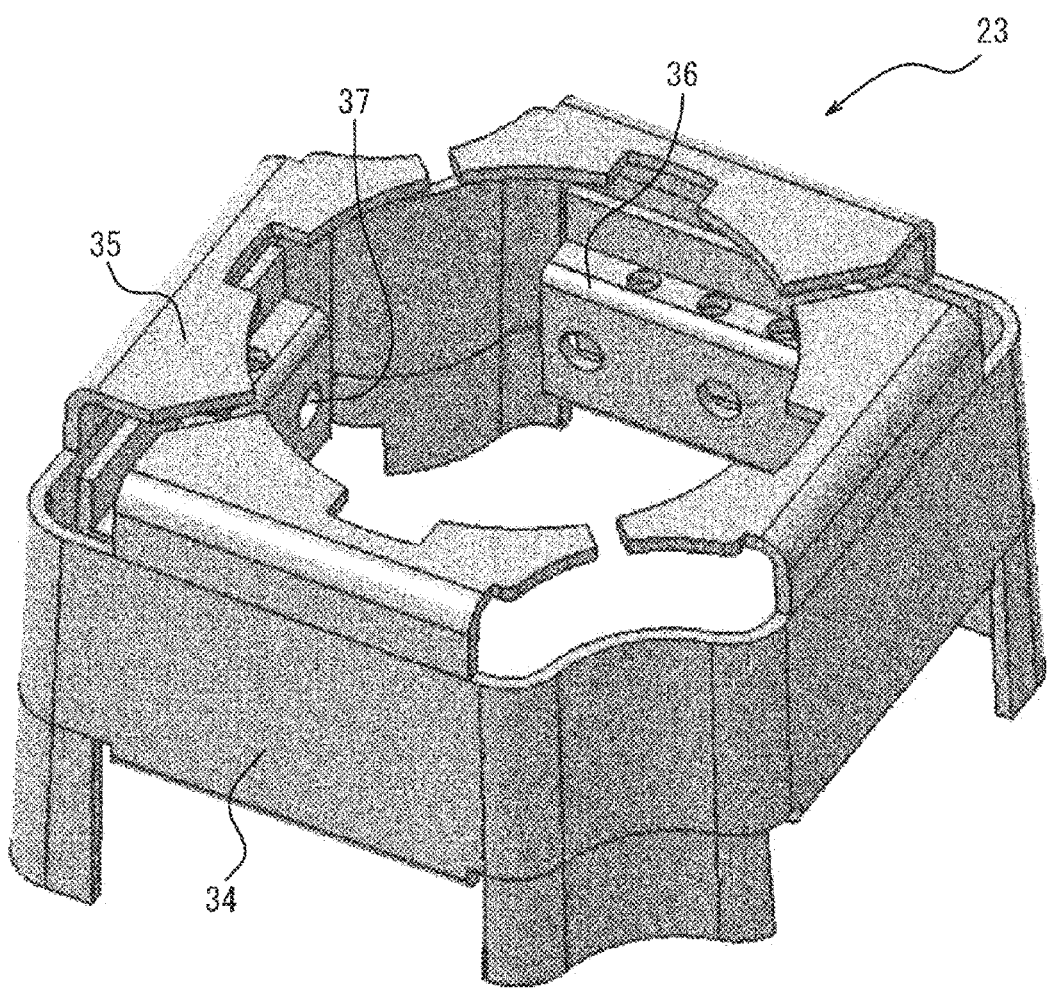
FIG. 6 is a perspective view of the appearance of a second metal plate in FIG. 2.

As FIG. 6 illustrates, the second metal plate 23 has a tubular shape having a generally substantially rectangular section. The second metal plate 23 has a second peripheral wall portion 34, a second plate portion 35, and a folded portion 36.

The second peripheral wall portion 34 has a tubular shape having a substantially rectangular section. The outer periphery of the second metal plate 23 substantially coincides with the inner periphery of the first metal plate 22.

The second plate portion 35 has a substantially plate shape. The second plate portion 35 extends radially inward from an end, in the axial direction, of the second peripheral wall portion 34. In the present embodiment, the second plate portion 35 is formed by each of four side walls of the second peripheral wall portion 34 being bent substantially horizontally with respect to the axial direction toward the radially inner side. The second plate portion 35 has an opening for exposing the imaging optical system 12 when accommodating the imaging optical system 12.

The folded portion 36 has a tubular shape. The folded portion 36 is formed along an end portion of the second peripheral wall portion 34 opposite to the end of the second peripheral wall portion 34 continuous from the second plate portion 35. More specifically, the folded portion 36 is formed by each of the four side walls constituting the second peripheral wall portion 34 being folded back radially inward so that an end portion of the side wall is in contact with the inner surface of the second peripheral wall portion 34. The above-described end portions of the four side walls may be joined to the inner surface of the second peripheral wall portion 34 by, for example, welding. In a metal plate constituting the corresponding folded portion 36, at least one inflow port 37 is formed in a surface facing the inner space. During the insert molding of the first housing 16, when the second metal plate 23 is installed in, for example, a mold, and a resin material is poured into the mold, the resin material can flow into the inner space of a tubular portion of the folded portion 36 through the inflow port 37.

The second metal plate 23 is formed by predetermined portions of a metal plate, in other words, a substantially tubular plate made of metal being pressed or bent. Although the second metal plate 23 is made of, for example, an alloy such as nickel silver, the material of the second metal plate 23 is not limited thereto, and the second metal plate 23 may be made of any metal. The second metal plate 23 may be made of the same material as the material of the first metal plate 22. The thickness of the second metal plate 23 may be larger than the thickness of the first metal plate 22.

Figure 7:
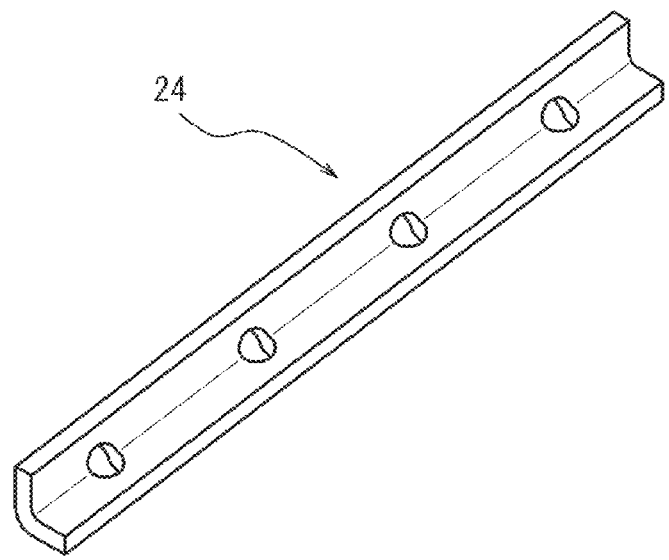
FIG. 7 is a perspective view of the appearance of a third metal plate in FIG. 2.

As FIG. 7 illustrates, the third metal plate 24 may have a shape in which a substantially rectangular metal plate is folded so that the section of the third metal plate 24 orthogonal to the longitudinal direction has an L shape. The third metal plate 24 has at least one inflow port so as not to hinder the flow of the poured resin material during the insert molding of the first housing 16.

The third metal plate 24 is formed by a predetermined portion of a metal plate, in other words, a plate made of metal being pressed or bent. The third metal plate 24 may be made of the same material as the material of the first metal plate 22.

Figure 8:
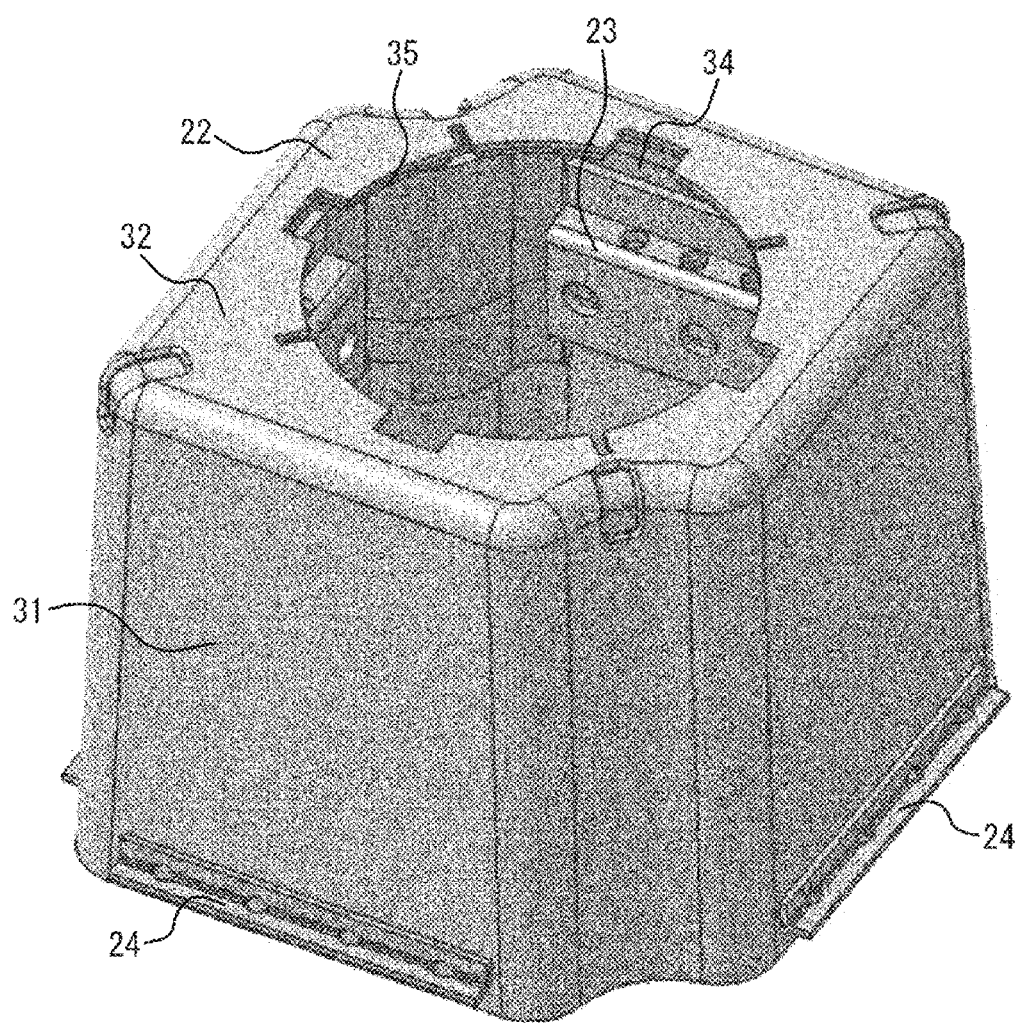
FIG. 8 is a perspective view of the appearance of the first substrate, the second substrate, and the third metal plates in FIG. 2 in a state of being joined to the corresponding metal plate.

As FIG. 8 illustrates, the first metal plate 22, the second metal plate 23, and the third metal plate 24 are joined to each other by welding. The second metal plate 23 is joined to the first metal plate 22 from the radially inner side. Specifically, the second metal plate 23 is inserted inside the first metal plate 22 so that the positions of the opening of the second plate portion 35 and the opening of the first plate portion 32 overlap with each other. The second plate portion 35 is welded to the first plate portion 32, and the second peripheral wall portion 34 is welded to a portion of the first peripheral wall portion 31. Moreover, the third metal plate 24 is welded to a radially outer surface of an end portion of each of the four side walls constituting the first peripheral wall portion 31, the end portion being opposite to the end continuous from the first plate portion 32. Although, in the present embodiment, the first metal plate 22, the second metal plate 23, and the third metal plate 24 are joined to each other by welding, the method for joining is not limited thereto, and examples of such joining may include caulk-fastening and adhesive-bonding.

As described above, the first metal plate 22, the second metal plate 23, and the third metal plate 24 that are joined to each other by welding is installed in, for example, a mold, and the insert molding is performed by a resin material such as polyamide being injected into the mold to form the first housing 16.

Referring back to FIG. 4, the shape of the first housing 16 formed by insert molding will further be described. At the section of the first housing 16 orthogonal to the axial direction, the resin portion 25 is formed so as to cover a portion of the inner peripheral surface and the entire outer peripheral surface of the first metal plate 22 and the second metal plate 23. The inner space of the tubular shape of the folded portion 36 of the second metal plate 23 is also filled with the resin portion 25.

The first metal plate 22 is provided so that, in the first housing 16, the first plate portion 32 is positioned on the first open portion 26 side and so that the axis of the first metal plate 22 substantially coincides with the axis of the first housing 16. In the present embodiment, the first peripheral wall portion 31 of the first metal plate 22 extends from the tubular portion 27 to the second open portion 28 of the resin portion 25. In the first housing 16, at least a portion of the first metal plate 22, more specifically, at least a portion of the first peripheral wall portion 31 positioned on the second open portion 28 side is exposed to the inner space of the first housing 16. As FIG. 2 illustrates, in the present embodiment, the exposed portion of the first metal plate 22 is in contact with a side surface of the heat dissipating sheet 21, in the electronic device 10. Thus, the first metal plate 22 is in indirect contact with the electronic component 13 such as the image sensor 19 with at least one of the heat dissipating sheet 21, the first substrate 14, and the second substrate 15 interposed therebetween.

In addition, as FIG. 4 illustrates, the second metal plate 23 is provided so that, in the first housing 16, the second plate portion 35 is positioned on the first open portion 26 side and so that the axis of the second metal plate 23 substantially coincides with the axis of the first housing 16. In the present embodiment, the second metal plate 23 is provided so as to extend between the end of the tubular portion 27 continuous from the first open portion 26 and the joining portion 29. In the first housing 16, at least a portion of the second metal plate 23 is exposed to the inner space of the first housing 16 from the mold receiving portion 30. As the crosshatched regions in FIG. 9 indicate, the portions of the second metal plate 23 that are exposed from the mold receiving portion 30 may be at least portions of the second plate portion 35 and the folded portions 36. At least a portion of the portions of the second metal plate 23 that are exposed to the inner space of the first housing can be a portion being in direct contact with, for example, a mold when the second metal plate 23 is installed in, for example, the mold, during the insert molding of the first housing 16.

As FIG. 2 illustrates, the second housing 17 may have a tubular shape having a rectangular section. The second housing 17 is provided so as to cover the first housing 16, in the electronic device 10. In more detail, the second housing 17 is provided so as to cover the first peripheral wall portion 31 and the first plate portion 32 of the first housing 16. The second housing 17 may accommodate the imaging optical system 12 and the first housing 16 so that, in the electronic device 10, the optical axis of the imaging optical system 12 substantially coincides with the axis of the second housing 17 and so that the imaging optical system 12 is exposed from an opening on one side of the second housing 17. The second housing 17 may be made of a resin material such as polyamide.

The third housing 18 may have a box shape having an open side. At a plate-shaped portion, the third housing 18 may be sealed at an opening of the first housing 16 on the side opposite to the side of the first housing 16 on which the imaging optical system 12 is exposed, that is, an opening on the image side of the imaging optical system 12 in the optical axis direction. As FIG. 10 illustrates, the third housing 18 may have the above-described connector 20B, a fourth metal plate 38, and an electrically conductive rubber 39.

The fourth metal plate 38 has a shape having a plate-shaped portion and a substantially rectangular tubular portion extending substantially orthogonally from the outer edge of a main surface of the plate-shaped portion. As FIG. 2 illustrates, in the electronic device 10, the fourth metal plate 38 faces and covers at least a portion of a main surface of each of the first substrate 14 and the second substrate 15.

Figure 10:
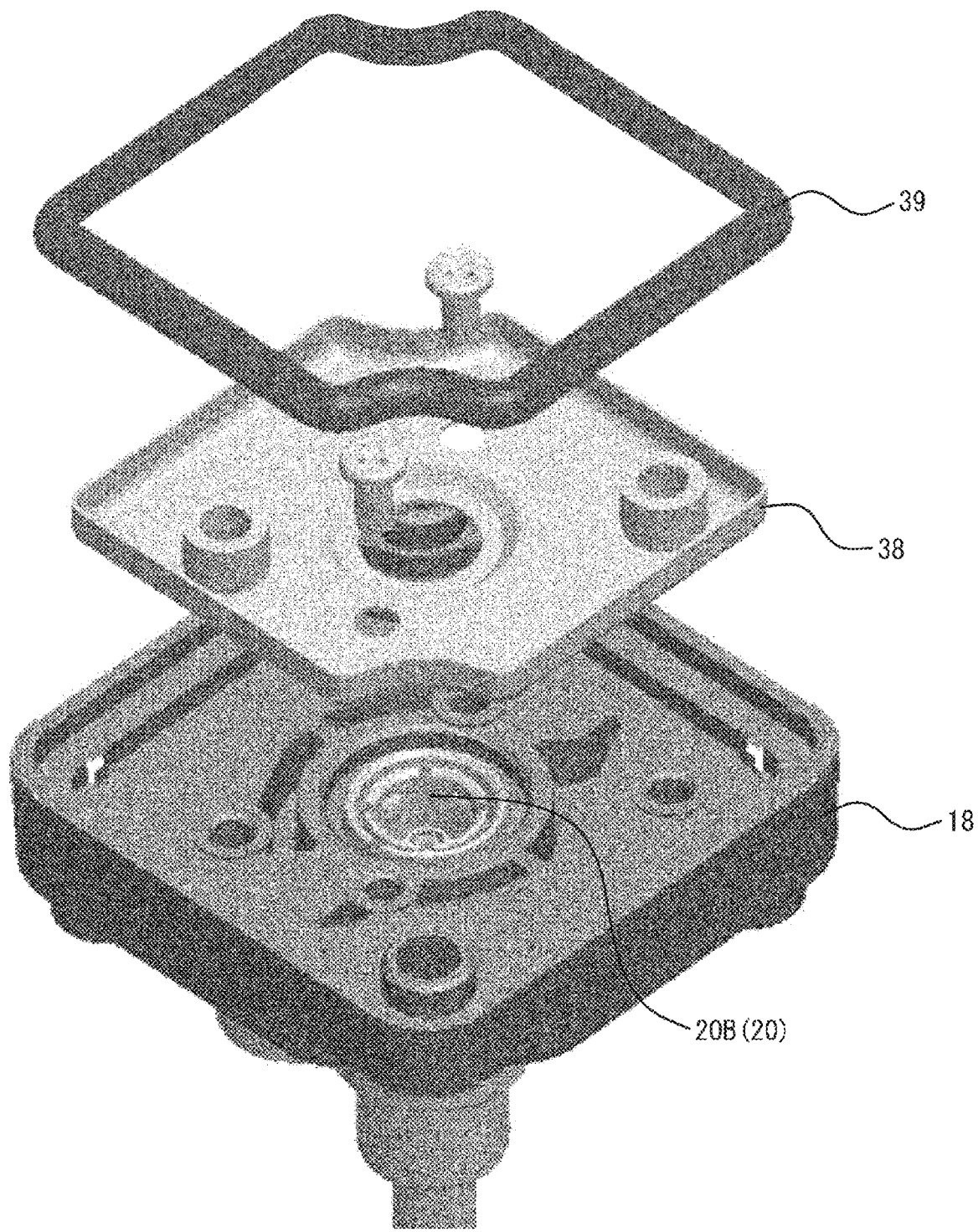
FIG. 10 is an exploded perspective view of a portion of a third housing in FIG. 2.

As FIG. 10 illustrates, the electrically conductive rubber 39 may be an electrically conductive annular rubber material. The electrically conductive rubber 39 is fixed to, in the substantially prismatic portion of the fourth metal plate 38, the periphery of an end portion opposite to an end continuous from the plate-shaped portion of the fourth metal plate 38. As FIG. 2 illustrates, the electrically conductive rubber 39 is in contact with the first metal plate 22 of the first housing 16 with the first housing 16 and the third housing 18 being sealed with each other. Thus, the electrically conductive rubber 39 physically fills up a space between the first housing 16 and the third housing 18 and connects the first metal plate 22 and the fourth metal plate 38 to each other in an electrically and thermally conducting manner.

The first housing 16, the second housing 17, and the third housing 18 are fixed by the second housing 17 and the third housing 18 holding, therebetween in the axial direction, a portion of the second open portion 28 of the first housing 16 protruding in the radial direction. For fixing the first housing 16, the second housing 17, and the third housing 18, for example, screw-fastening is applicable; however, the method for fixing the housings is not limited thereto, and welding and adhesive-bonding may be applied.

Regarding the electronic device 10, according to the embodiment, having such an above-described configuration, the first metal plate 22 covers over the entire periphery of each of the first substrate 14 and the second substrate 15 from the radially outer side. Due to such a configuration, the electronic device 10 can have a shielding property against the radiation noise from the electronic components 13 including the image sensor 19 that are mounted on the first substrate 14 and the second substrate 15.

In addition, in the electronic device 10 according to the embodiment, the first metal plate 22 and the second metal plate 23 are included in the first housing 16. Thus, due to the structure in which the first housing 16 itself includes such metal plates, the inner space of the first housing 16 can be enlarged, and the size of the first housing 16 and the size of the electronic device 10 can be reduced.

Moreover, in the electronic device 10 according to the embodiment, the first housing 16 is formed by insert molding so that the resin portion 25 covers the first metal plate 22, the second metal plate 23, and the third metal plate 24. Due to such a configuration, in the electronic device 10, the dimensions of the first housing 16 are not easily changed when the temperature of the electronic device 10 increases, compared with the case where the first housing 16 is made of only resin. Thus, the positions of, for example, the imaging optical system 12 and the image sensor 19 in the electronic device 10 are not easily shifted, and the focus of the lens of the electronic device 10 that is an imaging device is thereby not easily shifted.

Moreover, in the electronic device 10 according to the embodiment, a portion of each of the first metal plate 22 and the second metal plate 23 is covered by resin. Due to such a configuration, in the electronic device 10, the first housing 16 is easily formed into any shape.

Thus, as described above, the electronic device 10 according to the embodiment can have a further reduced size while having a shielding property against radiation noise.

In addition, in the first housing 16 of the electronic device 10 according to the embodiment, a portion of each of the first metal plate 22 and the second metal plate 23 is covered by resin. Due to such a configuration, weight reduction and cost reduction of the electronic device 10 can be achieved, compared with the case where the first housing 16 is made of only metal and formed by, for example, die-casting. In addition, the exterior part of the first housing 16 is covered with resin, and, unlike the housing made of only metal, the outer periphery of the first housing 16 is thereby not required to be coated.

In addition, in the electronic device 10 according to the embodiment, the first metal plate 22 has the first peripheral wall portion 31 that covers the first substrate 14 and the second substrate 15 from the outer peripheral direction of each of the first substrate 14 and the second substrate 15, and the first metal plate 22 also has the first plate portion 32 that extends radially inward from an end of the first peripheral wall portion 31. Due to such a configuration, in the axial direction, the electronic device 10 can also have a shielding property against the radiation noise from the electronic components 13 including the image sensor 19 that are mounted on the first substrate 14 and the second substrate 15.

In addition, in the first metal plate 22 of the electronic device 10 according to the embodiment, the first peripheral wall portion 31 and the first plate portion 32 are formed by being pressed or bent without a process such as welding. Due to such a configuration, the first metal plate 22 can be produced with a simple configuration. In addition, the possibility that problems such as deformation and breakage of the first metal plate 22 are caused by resin flowing into a welded portion during the insert molding of the first housing 16 is reduced by the first metal plate 22 being formed without welding.

In addition, in the first metal plate 22 of the electronic device 10 according to the embodiment, the drawing portion 33 is provided, in the outer edge of the first plate portion 32, from the first plate portion 32 to the first peripheral wall portion 31. Due to such a configuration, with the electronic device 10, the possibility that, during the insert molding of the first housing 16, the first metal plate 22 installed in, for example, a mold deforms due to, for example, the pressure and heat applied by the poured resin is reduced.

In addition, in the first metal plate 22 of the electronic device 10 according to the embodiment, the drawing portion 33 has a shape recessed toward the inner side relative to the tubular first metal plate 22. Due to such a configuration, the thickness of a portion of the resin portion 25 of the first housing 16 covering the outer side of the first metal plate 22 can be increased, compared with the case where the drawing portion 33 protrudes toward the outer side relative to the first metal plate 22, even if the electronic devices 10 in both cases have the same outside dimensions. Thus, the resistance of the electronic device 10 to, for example, external impact can be increased.

In addition, in the electronic device 10 according to the embodiment, at least a portion of the first metal plate 22 is exposed to the inner space of the first housing 16. Due to such a configuration, the heat in the inner space of the first housing 16 is easily conducted to the first metal plate 22, and the heat dissipation performance of the electronic device 10 can thereby be improved, compared with the case where the inner peripheral surface of the first metal plate 22 is covered with resin. Moreover, the exposed portion of the first metal plate 22 can be in contact with the heat dissipating sheet 21, in the electronic device 10. Due to such a configuration, the first metal plate 22 is in direct or indirect contact with the electronic component 13 such as the image sensor 19 that is mounted on one of the first substrate 14 and the second substrate 15, and the heat dissipation performance of the electronic device 10 can thereby be further improved.

In addition, in the first housing 16 of the electronic device 10 according to the embodiment, the first metal plate 22 extends from the tubular portion 27 to the second open portion 28. Due to such a configuration, with the first metal plate 22, the temperatures of the inside of the first housing 16 can be distributed and leveled. Thus, with the electronic device 10, the possibility that the lens of the imaging optical system 12 fogs up can be reduced by a temperature difference between a heat source such as the image sensor 19 and the lens of the imaging optical system 12 being reduced.

In addition, in the electronic device 10 according to the embodiment, the second metal plate 23 has the second peripheral wall portion 34 joined to the first metal plate 22 from the radially inner side, the second plate portion 35 extending radially inward from an end of the second peripheral wall portion 34, and the folded portion 36 having a tubular shape and formed along an end portion of the second peripheral wall portion 34 opposite to the end of the second peripheral wall portion 34. Due to such a configuration, the possibility that the first metal plate 22 deforms due to, for example, the pressure and heat applied by the poured resin is reduced by the second metal plate 23 supporting the first metal plate 22 at the folded portion 36, during the insert molding of the first housing 16.

Moreover, in the electronic device 10 according to the embodiment, at least a portion of the second metal plate 23 is exposed to the inner space of the housing. Due to such a configuration, the exposed portion of the second metal plate 23 can be in direct contact with, for example, a mold during the insert molding of the first housing 16. Thus, the possibility that the first metal plate 22 deforms due to, for example, the pressure and heat applied by the poured resin is reduced by the second metal plate 23 supporting the first metal plate 22 at the exposed portion.

In addition, in the first housing 16 of the electronic device 10 according to the embodiment, the thickness of the second metal plate 23 is larger than the thickness of the first metal plate 22. Due to such a configuration, with the second metal plate 23, the possibility that the first metal plate 22 deforms due to, for example, the pressure and heat applied by the poured resin during the insert molding of the first housing 16 can be reduced. Thus, the thickness of the first metal plate 22 covering the entire first housing 16 can be reduced, and the size of the first housing 16 and the size of the electronic device 10 can be reduced.

In addition, in the electronic device 10 according to the embodiment, as described above, the folded portion 36 of the second metal plate 23 has a tubular shape. Due to such a configuration, biting of the second metal plate 23 into the resin is improved by the resin flowing into the inner space of the folded portion 36 during the insert molding of the first housing 16, and the joining strength between the metal plates constituting the first housing 16 and the resin can be increased.

In addition, in the electronic device 10 according to the embodiment, the third metal plate 24 having an L-shaped section taken in the longitudinal direction is joined to the radially outer surface of the first metal plate 22. Due to such a configuration, the joining strength between the metal plates constituting the first housing 16 and the resin can be increased by the contact surface between the metal plates and the resin being enlarged during the insert molding of the first housing 16.

Moreover, in the electronic device 10 according to the embodiment, the first metal plate 22, the second metal plate 23, and the third metal plate 24 are made of the same material. Thus, the peel strength in the case where the first metal plate 22, the second metal plate 23, and the third metal plate 24 are joined to each other by, for example, welding can be increased.

In addition, in the first housing 16 in the electronic device 10 according to the embodiment, at least a portion of the surface facing the inner space of the first housing 16 has the joining portion 29 made of resin. The joining portion 29 is joined to a main surface of the first substrate 14 in the electronic device 10. Due to such a configuration, in the electronic device 10, the image sensor 19 is easily fixed at a predetermined position and in a predetermined orientation with respect to the imaging optical system 12.

In addition, in the electronic device 10 according to the embodiment, the first metal plate 22 and the fourth metal plate 38 are connected to each other in an electrically conducting manner with the electrically conductive rubber 39 interposed therebetween, in the state where the first housing 16 and the third housing 18 are joined to each other. Due to such a configuration, in the electronic device 10, the first metal plate 22 can be grounded by the fourth metal plate 38 being grounded, and the possibility that the first metal plate 22 acts as an antenna can thereby be reduced. Moreover, the heat generated from a component being in direct or indirect contact with the first metal plate 22 is also conducted to the fourth metal plate 38, and the heat dissipation performance of the electronic device 10 can thereby be further improved.

Although the present disclosure has been described based on the drawings and examples, it should be noted that various changes and modifications may easily be made by those who are ordinarily skilled in the art based on the present disclosure. Therefore, it should be noted that such changes and modifications are included in the scope of the present disclosure.

For example, although the first housing 16 has the first metal plate 22, the second metal plate 23, and the third metal plate 24 in the description of the above-described embodiment, the configuration is not limited thereto. For example, the first housing 16 may have a configuration without the third metal plate 24. Alternatively, a portion corresponding to the third metal plate 24 may be formed in the first metal plate 22 by an end of the first metal plate 22 being pressed or bent radially outward. Due to such a configuration, the electronic device 10 can be produced in a facilitated manner at reduced costs.

In addition, for example, although the first metal plate 22, the second metal plate 23, and the third metal plate 24 are joined to each other by welding in the description of the above-described embodiment, the configuration is not limited thereto. For example, the first metal plate 22, the second metal plate 23, and the third metal plate 24 may be fixed to each other by insert molding. Through the insert molding, the first metal plate 22, the second metal plate 23, and the third metal plate 24 are installed in, for example, a mold so as to be in contact with each other, and a resin material such as polyamide is injected into the mold. In addition, for example, the first metal plate 22 and the second metal plate 23 may be fitted to each other by the second metal plate 23 being inserted into the first metal plate 22 from the radially inner side.

In addition, for example, although the electronic device 10 has the first housing 16, the second housing 17, and the third housing 18 in the description of the above-described embodiment, the configuration is not limited thereto. For example, the electronic device 10 may have a configuration without the third housing 18. Due to such a configuration, the electronic device 10 can be produced in a facilitated manner at reduced costs.

In addition, for example, although the electronic device 10 has the first substrate 14 and the second substrate 15 in the description of the above-described embodiment, the configuration is not limited thereto. For example, the electronic device 10 may have a configuration including only the first substrate 14. Due to such a configuration, the size of the electronic device 10 can be reduced.

In addition, for example, although the drawing portion 33 has a shape recessed toward the inner side relative to the tubular first metal plate 22 in the description of the above-described embodiment, the configuration is not limited thereto. For example, the drawing portion 33 may have a shape protruding toward the outer side relative to the tubular first metal plate 22. Due to such a configuration, the possibility that the first metal plate 22 installed in, for example, a mold deforms due to, for example, the pressure and heat applied by the poured resin during the insert molding of the first housing 16 can thereby be further reduced.

The invention claimed is:

1. An electronic device comprising:
    an electronic component;
    a substrate on which the electronic component is mounted; and
    a housing having a tubular shape and including a first metal plate that is a tubular metal plate covering the electronic component and the substrate from an outer peripheral direction of the substrate and a second metal plate that is a tubular metal plate joined to the first metal plate from a radially inner side, a portion of each of the first metal plate and the second metal plate being covered with resin,
    wherein the housing has a joining portion, at least at a portion of a surface facing an inner space of the housing, made of the resin and joined to a main surface of the substrate.

2. The electronic device according to claim 1,
    wherein the first metal plate has a first peripheral wall portion that covers the electronic component and the substrate from an outer side relative to the outer peripheral direction of the substrate and a first plate portion that extends radially inward from an end, in an axial direction, of the first peripheral wall portion, and
    wherein the first plate portion faces at least a portion of a main surface of the substrate accommodated in the housing.

3. The electronic device according to claim 2,
    wherein a drawing portion is provided, in an outer edge of the first peripheral wall portion, from the first plate portion to the first peripheral wall portion.

4. The electronic device according to claim 1,
    wherein at least a portion of the first metal plate is exposed to an inner space of the housing.

5. The electronic device according to claim 1,
    wherein the second metal plate has a second peripheral wall portion that is joined to the first metal plate from the radially inner side, a second plate portion that extends radially inward from an end, in an axial direction, of the second peripheral wall portion, and a folded portion having a tubular shape and formed along an end portion of the second peripheral wall portion opposite to the end of the second peripheral wall portion, and wherein the folded portion is formed by the end portion of the second peripheral wall portion being folded back toward an inner space of the second metal plate.

6. The electronic device according to claim 5, wherein at least one port is formed on a surface of the folded portion formed in the second metal plate, the surface facing the inner space of the second metal plate, and wherein the resin is filled inside of the folded portion formed in the tubular shape.

7. The electronic device according to claim 1, wherein at least a portion of the second metal plate is exposed to an inner space of the housing.

8. An imaging device comprising:

an imaging optical system;

an electronic component including at least an image sensor;

a substrate on which the electronic component is mounted; and a housing having a tubular shape and including a first metal plate that is a tubular metal plate covering the electronic component and the substrate from an outer peripheral direction of the substrate and a second metal plate that is a tubular metal plate joined to the first metal plate from a radially inner side, a portion of each of the first metal plate and the second metal plate being covered with resin, wherein the housing has a joining portion, at least at a portion of a surface facing an inner space of the housing, made of the resin and joined to a main surface of the substrate.

9. A mobile body comprising:

the imaging device according to claim 8.

* * * * *